(12) United States Patent
Robison et al.

(10) Patent No.: US 9,348,658 B1
(45) Date of Patent: May 24, 2016

(54) TECHNOLOGIES FOR EFFICIENT SYNCHRONIZATION BARRIERS WITH WORK STEALING SUPPORT

(71) Applicants: Arch D. Robison, Champaign, IL (US); Alejandro Duran Gonzalez, Barcelona (ES)

(72) Inventors: Arch D. Robison, Champaign, IL (US); Alejandro Duran Gonzalez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/568,831

(22) Filed: Dec. 12, 2014

(51) Int. Cl.
*G06F 9/46* (2006.01)
*G06F 9/52* (2006.01)

(52) U.S. Cl.
CPC ............... *G06F 9/522* (2013.01); *G06F 9/466* (2013.01)

(58) Field of Classification Search
CPC ...................................................... G06F 9/522
USPC ...................................................... 718/1–108
See application file for complete search history.

(56) References Cited

U.S. PATENT DOCUMENTS

| | | | | |
|---|---|---|---|---|
| 7,512,950 B1 * | 3/2009 | Marejka | ..................... | G06F 9/52 718/102 |
| 8,065,681 B2 * | 11/2011 | Jia | ........................... | G06F 15/16 709/226 |
| 2007/0143755 A1 * | 6/2007 | Sahu | ................... | G06F 9/30087 718/100 |
| 2008/0201629 A1 * | 8/2008 | Duesterwald | ....... | G06F 11/3672 714/798 |
| 2013/0042245 A1 * | 2/2013 | Archer | .................... | G06F 9/522 718/102 |

OTHER PUBLICATIONS

Dagum, Leonardo, and Rameshm Enon. "OpenMP: an industry standard API for shared-memory programming." Computational Science & Engineering, IEEE 5.1 (1998): pp. 46-55.*

Lubachevsky, Boris D. "Synchronization barrier and related tools for shared memory parallel programming." International Journal of Parallel Programming 19.3 (1990): pp. 225-250.*

Gupta, Rajiv. "The fuzzy barrier: a mechanism for high speed synchronization of processors." ACM SIGARCH Computer Architecture News. vol. 17. No. 2. ACM, 1989, pp. 54-63.*

\* cited by examiner

*Primary Examiner* — Satish Rampuria
(74) *Attorney, Agent, or Firm* — Barnes & Thornburg LLP

(57) ABSTRACT

Technologies for multithreaded synchronization and work stealing include a computing device executing two or more threads in a thread team. A thread executes all of the tasks in its task queue and then exchanges its associated task stolen flag value with false and stores that value in a temporary flag. Subsequently, the thread enters a basic synchronization barrier. The computing device performs a logical-OR reduction over the temporary flags of the thread team to produce a reduction value. While waiting for other threads of the thread team to enter the barrier, the thread may steal a task from a victim thread and set the task stolen flag of the victim thread to true. After exiting the basic synchronization barrier, if the reduction value is true, the thread repeats exchanging the task stolen flag value and entering the basic synchronization barrier. Other embodiments are described and claimed.

21 Claims, 4 Drawing Sheets

TECHNOLOGIES FOR EFFICIENT SYNCHRONIZATION BARRIERS WITH WORK STEALING SUPPORT

BACKGROUND

For current computing devices and applications, efficient multithreaded performance is becoming increasingly important. OpenMP is a popular application programming interface (API) for shared-memory parallel programming. OpenMP specifies a synchronization barrier feature, which may be used to coordinate multiple threads executing in a thread team. In general, all threads of the thread team must reach the barrier before execution of the program may proceed. OpenMP also specifies a tasking system, in which threads may create and execute tasks. All tasks must be completed before the threads may exit a synchronization barrier. Thus, tasks are often executed while threads are waiting in synchronization barriers.

Many OpenMP implementations use "work-stealing," in which a thread may "steal" tasks to execute from another thread; that is, a thread may claim a task from another thread and run the task to completion. To be compatible with tasking requirements, OpenMP synchronization barriers are typically implemented as tree or linear barriers. However, tree barriers have a relatively longer critical path compared to non-tree barriers such as dissemination barriers.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
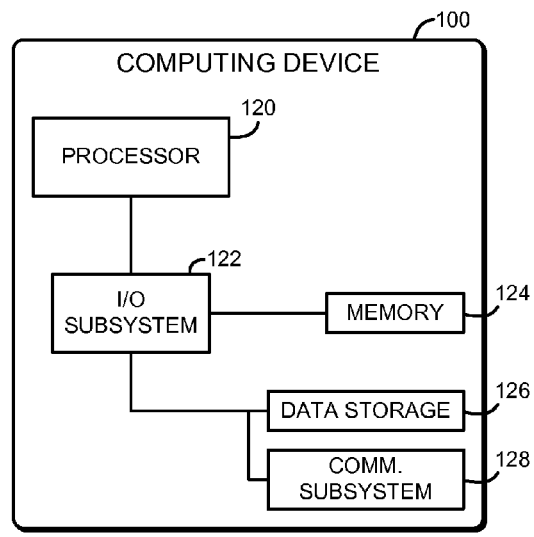
FIG. 1 is a simplified block diagram of at least one embodiment of a computing device for efficient synchronization barriers with work stealing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for efficient synchronization barriers with work stealing includes a processor 120, an I/O subsystem 122, a memory 124, and a data storage device 126. In use, as described below, the computing device 100 is configured to execute a number of tasks by a group of threads organized into a thread team. Each thread is associated with a corresponding task queue and a Boolean flag. After completing all of its pending tasks, a thread may enter a synchronization barrier. Before entering the barrier, the thread atomically exchanges its flag value with false and stores the original flag value in a thread-local temporary flag variable. While waiting for other threads to enter the barrier, the active thread may steal a task from another thread (the "victim" thread), set the flag of the victim thread to true, and execute the victim task (i.e., the task stolen from the victim thread) to completion. Execution of the victim task may cause more tasks to be added to the active thread's queue. The computing device 100 performs a logical-OR reduction operation over the temporary flag variables of each of the threads to generate a reduction value. The reduction value indicates whether any of the threads in the thread team had their corresponding flags set to true prior to entering the barrier. In other words, the reduction value indicates whether any of the threads had a task stolen (i.e., was a victim thread) prior to entering the barrier. If the reduction value is true, the computing device 100 causes all of the threads to retry the synchronization barrier. If the reduction value is false, the computing device 100 allows all of the threads to continue execution.

The computing device 100 may allow a non-tree barrier such as a dissemination barrier to be used compatibly with OpenMP tasking semantics. Non-tree barriers may improve performance compared to tree barriers. Illustratively, a computing device 100 as described herein including an Intel® Xeon Phi™ coprocessor may achieve synchronization barrier performance that is about twice as fast as conventional tree barriers. Additionally, although illustrated as a synchronization barrier for shared-memory multithreading, the techniques disclosed herein may be used for any concurrent execution environment including distributed computing environments.

The computing device 100 may be embodied as any type of device capable of efficient execution of synchronization barriers with work stealing and otherwise performing the functions described herein. For example, the computing device 100 may be embodied as, without limitation, a computer, a desktop computer, a workstation, a server computer, a distributed computing system, a multiprocessor system, a laptop computer, a notebook computer, a tablet computer, a smartphone, a mobile computing device, a wearable computing device, a consumer electronic device, a smart appliance, and/or any other computing device capable of efficient execution of synchronization barriers. As shown in FIG. 1, the illustrative computing device 100 includes the processor 120, the I/O subsystem 122, the memory 124, and the data storage device 126. Of course, the computing device 100 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), coprocessor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices.

The computing device 100 may also include a communication subsystem 128, which may be embodied as any communication circuit, device, or collection thereof, capable of enabling communications between the computing device 100 and other remote devices over a computer network (not shown). The communication subsystem 128 may be configured to use any one or more communication technology (e.g., wired or wireless communications) and associated protocols (e.g., Ethernet, Bluetooth®, Wi-Fi®, WiMAX, etc.) to effect such communication.

Figure 2:
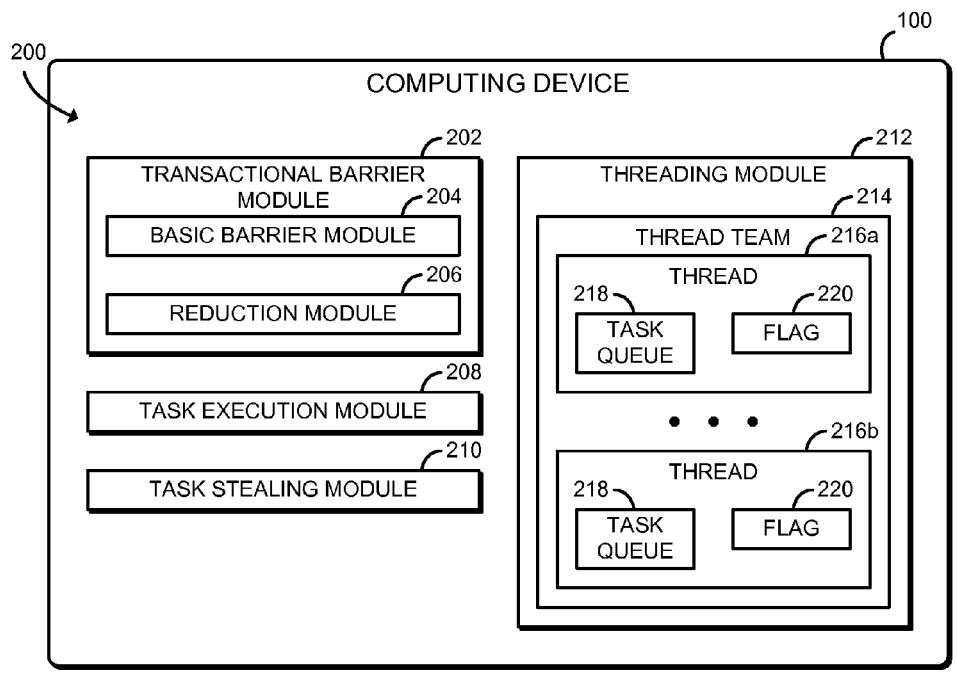
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative embodiment 200 includes a transactional barrier module 202, a basic barrier module 204, a reduction module 206, a task execution module 208, a task stealing module 210, and a threading module 212. The various modules of the environment 200 may be embodied as hardware, firmware, software, or a combination thereof. For example the various modules, logic, and other components of the environment 200 may form a portion of, or otherwise be established by, the processor 120 or other hardware components of the computing device 100. For example, in some embodiments, one or more of the modules of the environment 200 may be embodied as a circuit (e.g., a synchronization barrier circuit, a reduction circuit, etc.).

The threading module 212 is configured to create, execute, and otherwise manage a thread team 214 and one or more threads 216. The thread team 214 may be embodied as a collection of threads 216 that may be used to execute a particular group of tasks or other computing problem. Each of the threads 216 may be embodied as an operating system thread, managed executable thread, application thread, worker thread, lightweight thread, or other executable program. The threads 216 may share a common memory space but may also access thread-local storage, private variables, or other data that is not shared by multiple threads 216. Each thread 216 maintains a task queue 218 and a flag 220. The task queue 218 includes a list of executable tasks to be performed by the thread 216. As further described below, each thread 216 may execute tasks from its own task queue 218, or may steal tasks from the task queue 218 of a different thread 216 and execute the stolen tasks. The flag 220 includes a Boolean value (e.g., true or false) that may be set if another thread 216 has stolen a task from the task queue 218. A distinct task queue 218 and/or flag 220 may be stored for each thread 216, for example in a thread control structure or in thread-local storage. Additionally, although the illustrative embodiment 200 includes a single thread team 214 having two threads 216a, 216b, it should be understood that in some embodiments the environment 200 may include multiple thread teams 214, and each thread team 214 may have multiple threads 216.

The transactional barrier module 202 is configured to atomically exchange the flag 220 of the thread 216 with false and store the original value of the flag 220 in a thread-local temporary flag variable. The transactional barrier module 202 is configured to enter a basic synchronization barrier after exchanging the flag 220 and storing the temporary flag variable, using the basic barrier module 204. As further described below, the reduction module 206 generates a reduction value over the temporary flag variables of all of the threads 216 of the thread team 214. The transactional barrier module 202 is further configured to determine whether the reduction value is true and, if true, cause the thread 216 to retry exchanging the flag 220 and re-entering the basic synchronization barrier. That is, if the reduction value is true, transactional barrier module 202 is configured to repeat atomically exchanging the flag 220 of the thread 216 with false and storing the original value of the flag 220 in a thread-local temporary flag variable.

The reduction module 206 is configured to perform a logical "OR" reduction over the temporary flag variables of each of the threads 216 of the thread team 214 during execution of the basic synchronization barrier. In other words, reduction module 206 is configured to perform a logical OR operation on all of the locally stored flag values for each thread 216 and distribute the resulting reduction value to each of the threads 216. The reduction module 206 may use any algorithm for performing the reduction, including performing a non-tree based algorithm such as a dissemination barrier algorithm or a K-radix barrier algorithm.

The task execution module 208 is configured to pop tasks from the task queue 218 of a thread 216 and run those tasks to completion. The task execution module 208 may pop the first task from the task queue 218 or otherwise schedule tasks from the task queue 218. The task execution module 208 is also configured to determine whether the task queue 218 is empty prior to entering the synchronization barrier, and to enter the synchronization barrier in response to determining the task queue 218 is empty. The task execution module 208 is configured to leave the transactional barrier after exiting the basic synchronization barrier if the reduction value is false (i.e., if no further tasks were stolen from any threads 216 of the thread team 214).

The task stealing module 210 is configured to atomically steal a task from a victim thread 216 when a thread 216 is waiting in the synchronization barrier, and to set the flag 220 of the victim thread 216 to true in response to stealing the task. In some embodiments, as an optimization the task stealing module 210 may only set the flag 220 of the victim thread 216 to true if the flag 220 of the active thread 216 is not true (e.g., false). The task stealing module 210 may identify the victim thread 216 randomly, determine whether the task queue 218 of the victim thread 216 is empty, and, if not empty, pop a task from the task queue 218 of the victim thread 216. The task stealing module 210 may execute the victim task to completion, and after completing the victim task, execute any tasks that have been added to the task queue 218 of the active thread 216.

Figure 3:
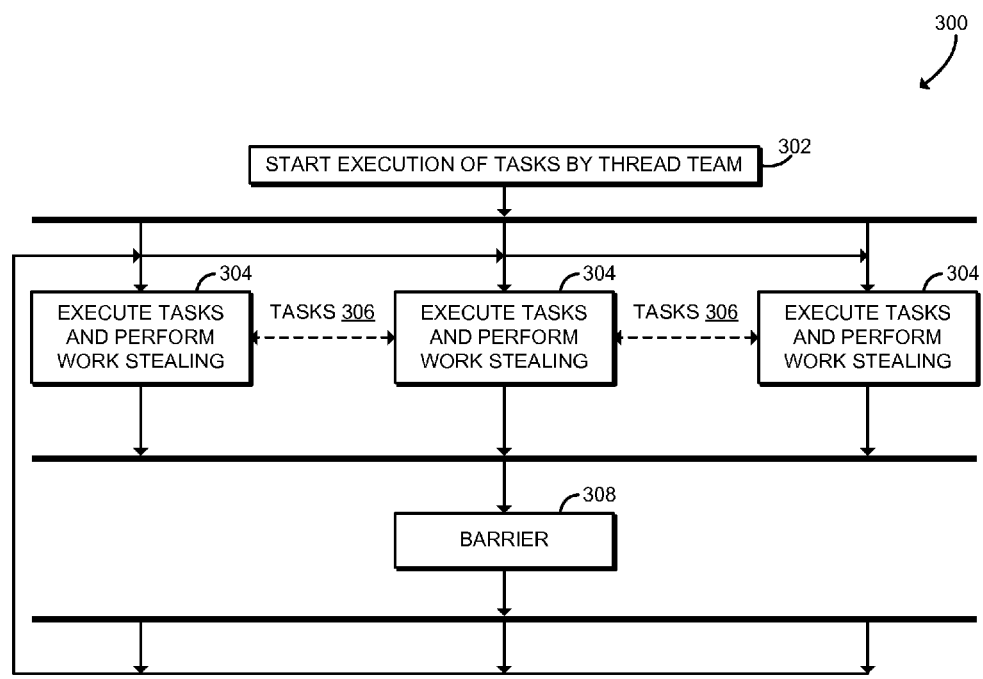
FIG. 3 is a simplified flow diagram of at least one embodiment of a method for parallel task execution and work stealing that may be executed by the computing device of FIGS. 1 and 2.

Referring now to FIG. 3, in use, the computing device 100 may execute a method 300 for parallel task execution and work stealing. The method 300 begins in block 302, in which the computing device 100 starts execution of a group of tasks by the thread team 214. Execution of the tasks may be started, for example, by a master thread or other control entity of the computing device 100. After starting execution of tasks, the method 300 proceeds in parallel to the blocks 304.

In the blocks 304, the computing device 100 executes tasks in parallel using the threads 216 and performs work stealing. For example, each of the threads 216 may execute tasks from its task queue 218 in parallel with the other threads 216. The illustrative method 300 shows three blocks 304, executed in parallel by three threads 216. Of course, other embodiments may include fewer or additional blocks 304 executed by corresponding threads 216. As shown in the method 300, tasks 306 may be transferred between the threads 216 during execution of the blocks 304. For example, a thread 216a may steal a task from the task queue 218 of a different thread 216b and then execute that stolen task.

After executing the tasks 306 in the blocks 304, the method 300 enters a transactional synchronization barrier 308. For example, each thread 216 may enter the synchronization barrier 308 after it has completed executing all of the tasks in its task queue 218. The threads 216 wait within the transactional synchronization barrier 308 until all of the tasks to be executed by the thread team 214 have been run to completion. As further described below, threads 216 waiting in the synchronization barrier 308 may steal tasks 306 from threads 216 that are still executing within the blocks 304. After all tasks are complete, the method 300 loops back to the blocks 304 to continue executing tasks in parallel and performing work stealing.

Figure 4:
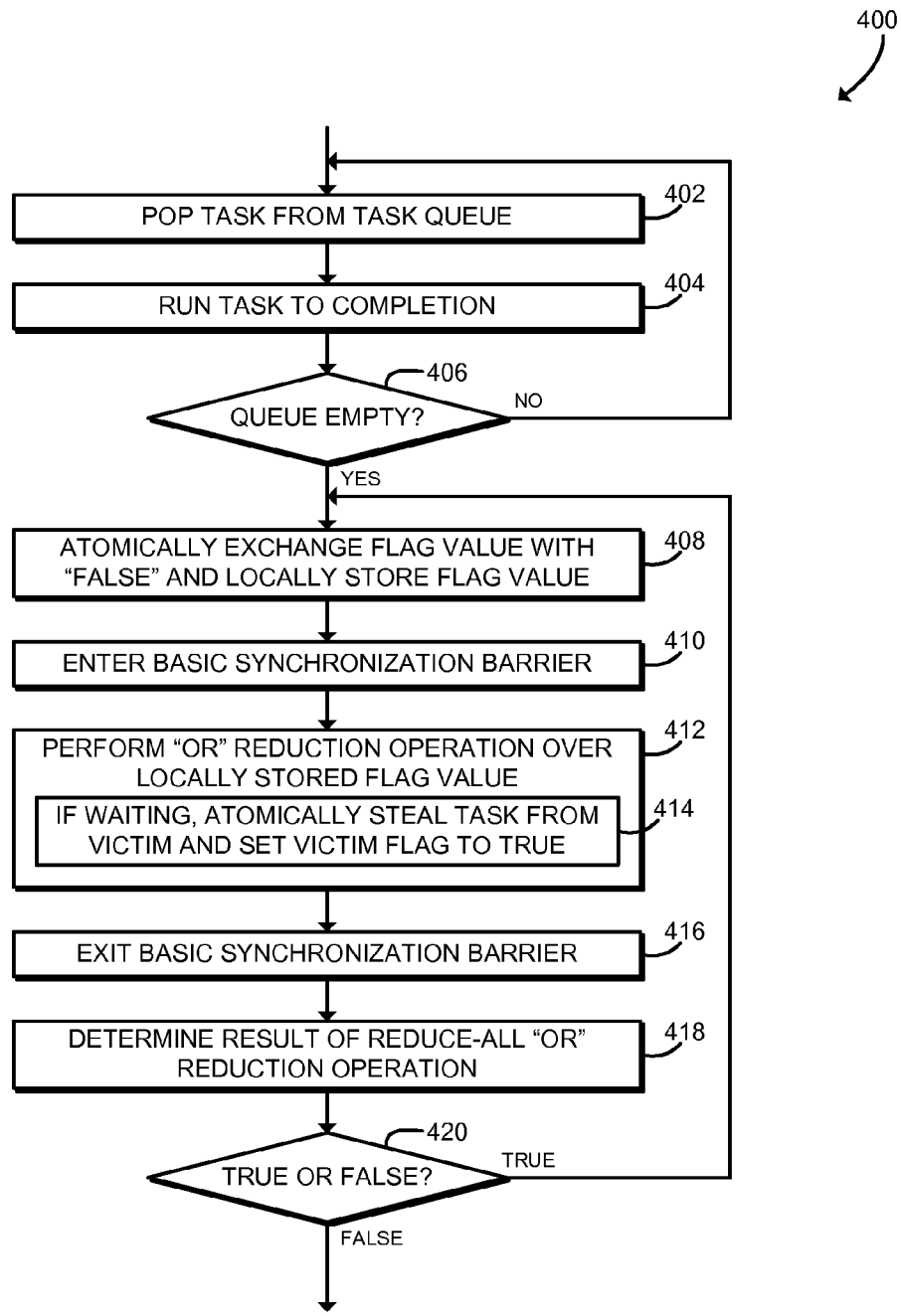
FIG. 4 is a simplified flow diagram of at least one embodiment of a method for executing a synchronization barrier that may be executed by the computing device of FIGS. 1 and 2.

Referring now to FIG. 4, in use, the computing device 100 may execute a method 400 for executing a synchronization barrier. An instance of the method 400 may be executed by each of the threads 216 of the thread team 214, for example during execution of the method 300 of FIG. 3. The method 400 begins in block 402, in which the computing device 100, in a thread 216a, pops a task from the task queue 218 of the thread 216a. The task queue 218 may be embodied as any queue, doubly-ended queue, list, array, buffer, or other data structure used to store tasks to be executed by the thread 216a. The task queue 218 may be stored in thread-local storage or other storage associated with the thread 216a. In some embodiments, the task queue 218 may be accessible to other threads 216.

In block 404, the computing device 100 runs the task to completion using the thread 216a. After completing the task, in block 406, the computing device 100 determines whether the task queue 218 of the thread 216a is empty. If not, the method 400 loops back to block 402 to continue executing tasks from the task queue 218. If the task queue 218 is empty, the method 400 advances to block 408.

In block 408, the computing device 100, using the thread 216a, exchanges the flag 220 with the Boolean "false" value and locally stores the previous value of the flag 220. For example, the previous value of the flag 220 may be stored in a private variable of the thread 216a or otherwise stored in thread-local storage of the thread 216a. The computing device 100 may exchange and locally store the flag value using one or more atomic operations. In some embodiments, the computing device 100 may instead use non-atomic operations protected by a lock on the task queue 218 or other synchronization mechanism.

In block 410, the computing device 100 enters a basic synchronization barrier using the thread 216a. The basic synchronization barrier may be embodied as any type of synchronization barrier, including a tree barrier, a linear barrier, or a non-tree barrier such as a dissemination barrier. In some embodiments, the basic synchronization barrier may be embodied as a K-radix synchronization barrier such as the barrier described in the co-pending U.S. patent application Ser. No. 14/568,890, entitled "Technologies for Fast Synchronization Barriers for Many-Core Processing."

In block 412, the computing device 100 performs a logical "OR" reduction operation over the locally stored flag value. In other words, the computing device 100 performs a logical OR operation on all of the locally stored flag values for each thread 216 and distributes the resulting reduction value to each of the threads 216. As further described below, the reduction value is indicative of whether any of the threads 216 had a task stolen prior to entering the synchronization barrier. In other words, the reduction value is true if the flag 220 of any of the threads 216 was true prior to the corresponding thread 216 entering the synchronization barrier.

In block 414, if the thread 216a is waiting in the synchronization barrier for other threads 216, the computing device 100 may steal one or more tasks from another thread 216b (the "victim" thread 216b) and set the flag 220 of the victim thread 216b to true. One potential embodiment of the work-stealing process is further described below in connection with FIG. 5.

In block 416, the computing device 100 in the thread 216a exits the basic synchronization barrier. The thread 216a may exit the synchronization barrier in response to all other threads 216 of the thread team 214 entering the synchronization barrier. Thus, upon exiting the synchronization barrier, the reduction value may be determined.

In block 418, the computing device 100 in the thread 216a determines the reduction value, which is the result of the reduce-all logical OR operation described above in connection with block 412. As described above, if true, then one or more tasks were stolen from a thread 216 prior to that thread 216 entering the synchronization barrier and thus those tasks may still be in flight. In block 420, the computing device 100 determines whether the reduction value is true or false. If true, the method 400 loops back to block 408 to retry exchanging the flag 220 and then entering the barrier. If the reduction value is false, then the method 400 is completed. In other words, the computing device 100 determines whether the synchronization barrier completes without any tasks being stolen from a thread 216 and, if not, retries the synchronization barrier. Thus, the synchronization barrier operation performed by the computing device 100 during execution of the method 400 may be known as a transactional synchronization barrier or a transactional barrier.

Figure 5:
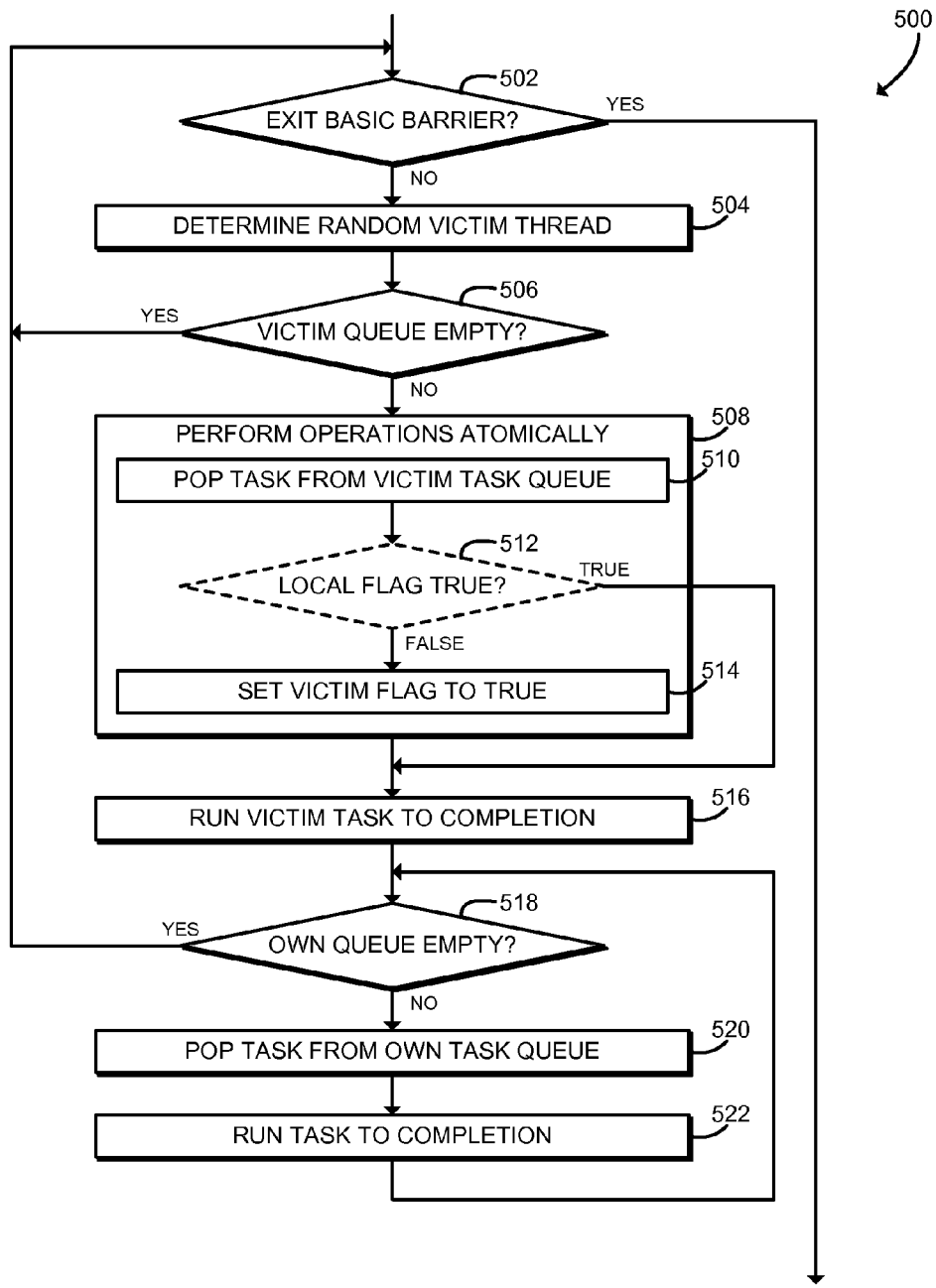
FIG. 5 is a simplified flow diagram of at least one embodiment of a method for work stealing during execution of a synchronization barrier that may be executed by the computing device of FIGS. 1 and 2.

Referring now to FIG. 5, in use, the computing device 100 may execute a method 500 for work stealing. The method 500 may be executed by the computing device 100 using a thread 216a while the thread 216a is waiting within a synchronization barrier, as described above in connection with block 414 of FIG. 4. The method 500 begins in block 502, in which the computing device 100, in the thread 216a, determines whether to exit the basic synchronization barrier. As described above in connection with block 416 of FIG. 4, the thread 216a may exit the synchronization barrier in response to all other threads 216 of the thread team 214 entering the synchronization barrier. If the computing device 100 determines to exit the synchronization barrier, the method 500 is completed. If the computing device 100 determines not to exit the synchronization barrier (i.e., the thread 216a is waiting within the synchronization barrier), the method 500 advances to block 504.

In block 504, the computing device 100, in the thread 216a, determines a random victim thread 216b. For example, the computing device 100 may randomly select a thread identifier or otherwise randomly select the victim thread 216b from the threads 216 of the thread team 214. In block 506, the computing device 100 using the thread 216a determines whether the task queue 218 of the victim thread 216b is empty. If empty, the method 500 loops back to block 504 to select another victim thread 216b. If the task queue 218 of the victim thread 216b is not empty, the method 500 advances to block 508.

In block 508, the computing device 100 performs operations atomically in the thread 216a. In particular, the computing device 100 performs the operations described below in connection with blocks 510-512 atomically. The computing device 100 may, for example, execute one or more atomic instructions or other atomic operations. In some embodiments, the computing device 100 may instead use non-atomic operations protected by a lock on the task queue 218 of the victim thread 216b or other synchronization mechanism.

In block 510, the computing device 100 in the thread 216a pops a task from the task queue 218 of the victim thread 216b. In some embodiments, after popping the task, the method 500 may proceed to block 512. In embodiments that do not include the block 512, the method 500 may proceed directly to block 514, described below. In block 512, the computing device 100 in the thread 216a determines whether the flag 220 of the thread 216a is true. If true, then the method 500 exits the atomic operation of the block 508 and proceeds to block 516, described below. If the flag 220 is false, the method 500 proceeds to the block 514, in which the computing device 100 in the thread 216a sets the flag 220 of the victim thread 216b to true. Checking whether the flag 220 is true in block 512 may improve performance by skipping the block 514 when it is not needed; if the flag 220 is already true, then the thread 216a can determine that the logical-OR reduction will return true without accessing the flag 220 of another thread 216b.

In block 516, the computing device 100 in the thread 216a runs the victim task to completion. That is, the computing device 100 executes the task popped from the task queue 218 of the victim thread 216b to completion. In block 518, the computing device 100 in the thread 216a determines whether the task queue 218 of the thread 216a is empty. As described above in connection with block 406 of FIG. 4, each thread 216 determines that its task queue 218 is empty prior to entering the synchronization barrier. However, during execution of the victim task in connection with block 516, one or more new tasks may have been created and added to the task queue 218 of the thread 216a. Thus, the thread 216a checks its own task queue 218 to determine whether any additional tasks have been added. If the task queue 218 is empty, the method 500 loops back to block 504 to continue performing work stealing. If the task queue 218 is not empty, the method 500 advances to block 520.

In block 520, the computing device 100 in the thread 216a pops a task from its task queue 218. In block 522, the computing device 100 in the thread 216a runs the task to completion. After completing the task, the method 500 loops back to block 518 to continue executing any tasks in the task queue 218 of the thread 216a.

EXAMPLES

Illustrative examples of the technologies disclosed herein are provided below. An embodiment of the technologies may include any one or more, and any combination of, the examples described below.

Example 1 includes a computing device for multithreaded execution, the computing device comprising a transactional barrier module to exchange, by a first thread of a thread team executed by the computing device, a value of a task stolen flag of the first thread with false and store the value of the task stolen flag in a temporary flag of the first thread, wherein the temporary flag is local to the first thread; and enter, by the first thread subsequent to exchange of the value of the task stolen flag, a synchronization barrier; and a reduction module to determine, by the first thread, whether any temporary flag of a plurality of temporary flags of the thread team was true upon entering of the synchronization barrier, wherein the thread team comprises a plurality of threads including the first thread; wherein the transactional barrier module is further to repeat, by the first thread, exchange of the value of the task stolen flag in response to a determination that any temporary flag of the plurality of temporary flags was true.

Example 2 includes the subject matter of Example 1, and wherein to determine whether any temporary flag of the plurality of temporary flags of the thread team was true comprises to perform, in response to entering of the synchronization barrier, a logical-OR reduction operation over the plurality of temporary flags of the thread team to provide a reduction value to each thread of the thread team.

Example 3 includes the subject matter of any of Examples 1 and 2, and wherein to exchange the value of the task stolen flag of the first thread with false and store the value of the task stolen flag in the temporary flag comprises to atomically exchange the value of the task stolen flag of the first thread with false and store the value of the task stolen flag in the temporary flag.

Example 4 includes the subject matter of any of Examples 1-3, and further including a task execution module to execute, by the first thread, a first task from a task queue of the first thread; and determine, by the first thread, whether the task queue is empty; wherein to exchange the value of the task stolen flag comprises to exchange the value of the task stolen flag in response to a determination that the task queue is empty.

Example 5 includes the subject matter of any of Examples 1-4, and wherein each of the plurality of temporary flags corresponds to a thread of the thread team.

Example 6 includes the subject matter of any of Examples 1-5, and wherein the transactional barrier module is further to wait, by the first thread, for other threads of the thread team to enter the synchronization barrier in response to the entering of the synchronization barrier.

Example 7 includes the subject matter of any of Examples 1-6, and further including a task stealing module to steal, by the first thread, a task from a second thread of the thread team in response to waiting for the other threads of the thread team to enter the synchronization barrier; and set, by the first thread, a task stolen flag of the second thread to true in response to stealing of the task.

Example 8 includes the subject matter of any of Examples 1-7, and wherein to steal the task and to set the task stolen flag of the second thread comprises to atomically steal the task and set the task stolen flag of the second thread.

Example 9 includes the subject matter of any of Examples 1-8, and wherein to steal the task comprises to identify the second thread of the thread team; and pop the task from a task queue of the second thread; wherein to pop the task and set the task stolen flag of the second thread comprises to atomically pop the task and set the task stolen flag of the second thread.

Example 10 includes the subject matter of any of Examples 1-9, and wherein to identify the second thread comprises to select the second thread randomly from the thread team.

Example 11 includes the subject matter of any of Examples 1-10, and wherein to identify the second thread further comprises to determine whether the task queue of the second thread is empty; and repeat selection of the second thread randomly in response to a determination that the task queue is empty.

Example 12 includes the subject matter of any of Examples 1-11, and wherein to steal the task further comprises to execute, by the first thread, the task to completion in response to popping of the task; determine, by the first thread, whether a task queue of the first thread is empty in response to execution of the task to completion; pop, by the first thread, a second task from the task queue in response to a determination that the task queue is not empty; and execute, by the first thread, the second task to completion in response to popping of the second task.

Example 13 includes the subject matter of any of Examples 1-12, and wherein the task stealing module is further to determine, by the first thread, whether the temporary flag of the first thread is equal to false in response to stealing of the task from the second thread; wherein to set the task stolen flag of the second thread to true further comprises to set the task stolen flag of the second thread to true in response to a determination that the temporary flag is equal to false.

Example 14 includes a method for multithreaded execution, the method comprising exchanging, by a first thread of a thread team executed by a computing device, a value of a task stolen flag of the first thread with false and storing the value of the task stolen flag in a temporary flag of the first thread, wherein the temporary flag is local to the first thread; entering, by the first thread subsequent to exchanging of the value of the task stolen flag, a synchronization barrier; determining, by the first thread, whether any temporary flag of a plurality of temporary flags of the thread team was true upon entering the synchronization barrier, wherein the thread team comprises a plurality of threads including the first thread; and repeating, by the first thread, exchanging the value of the task stolen flag in response to determining that any temporary flag of the plurality of temporary flags was true.

Example 15 includes the subject matter of Example 14, and wherein determining whether any temporary flag of the plurality of temporary flags of the thread team was true comprises performing, in response to entering the synchronization barrier, a logical-OR reduction operation over the plurality of temporary flags of the thread team to provide a reduction value to each thread of the thread team.

Example 16 includes the subject matter of any of Examples 14 and 15, and wherein exchanging the value of the task stolen flag of the first thread with false and storing the value of the task stolen flag in the temporary flag comprises atomically exchanging the value of the task stolen flag of the first thread with false and storing the value of the task stolen flag in the temporary flag.

Example 17 includes the subject matter of any of Examples 14-16, and further including executing, by the first thread, a first task from a task queue of the first thread; and determining, by the first thread, whether the task queue is empty; wherein exchanging the value of the task stolen flag comprises exchanging the value of the task stolen flag in response to determining that the task queue is empty.

Example 18 includes the subject matter of any of Examples 14-17, and wherein each of the plurality of temporary flags corresponds to a thread of the thread team.

Example 19 includes the subject matter of any of Examples 14-18, and further comprising waiting, by the first thread, for other threads of the thread team to enter the synchronization barrier in response to entering the synchronization barrier.

Example 20 includes the subject matter of any of Examples 14-19, and further including stealing, by the first thread, a task from a second thread of the thread team in response to waiting for the other threads of the thread team to enter the synchronization barrier; and setting, by the first thread, a task stolen flag of the second thread to true in response to stealing the task.

Example 21 includes the subject matter of any of Examples 14-20, and wherein stealing the task and setting the task stolen flag of the second thread comprises atomically stealing the task and setting the task stolen flag of the second thread.

Example 22 includes the subject matter of any of Examples 14-21, and wherein stealing the task comprises identifying the second thread of the thread team; and popping the task from a task queue of the second thread; wherein popping the task and setting the task stolen flag of the second thread comprises atomically popping the task and setting the task stolen flag of the second thread.

Example 23 includes the subject matter of any of Examples 14-22, and wherein identifying the second thread comprises selecting the second thread randomly from the thread team.

Example 24 includes the subject matter of any of Examples 14-23, and wherein identifying the second thread further comprises determining whether the task queue of the second thread is empty; and repeating selecting the second thread randomly in response to determining that the task queue is empty.

Example 25 includes the subject matter of any of Examples 14-24, and wherein stealing the task further comprises executing, by the first thread, the task to completion in response to popping the task; determining, by the first thread, whether a task queue of the first thread is empty in response to executing the task to completion; popping, by the first thread, a second task from the task queue in response to determining the task queue is not empty; and executing, by the first thread, the second task to completion in response to popping the second task.

Example 26 includes the subject matter of any of Examples 14-25, and further including determining, by the first thread, whether the temporary flag of the first thread is equal to false in response to stealing the task from the second thread; wherein setting the task stolen flag of the second thread to true further comprises setting the task stolen flag of the second thread to true in response to determining that the temporary flag is equal to false.

Example 27 includes a computing device comprising a processor; and a memory having stored therein a plurality of instructions that when executed by the processor cause the computing device to perform the method of any of Examples 14-26.

Example 28 includes one or more machine readable storage media comprising a plurality of instructions stored thereon that in response to being executed result in a computing device performing the method of any of Examples 14-26.

Example 29 includes a computing device comprising means for performing the method of any of Examples 14-26.

Example 30 includes a computing device for multithreaded execution, the computing device comprising means for exchanging, by a first thread of a thread team executed by the computing device, a value of a task stolen flag of the first thread with false and storing the value of the task stolen flag in a temporary flag of the first thread, wherein the temporary flag is local to the first thread; means for entering, by the first thread subsequent to exchanging of the value of the task stolen flag, a synchronization barrier; means for determining, by the first thread, whether any temporary flag of a plurality of temporary flags of the thread team was true upon entering the synchronization barrier, wherein the thread team comprises a plurality of threads including the first thread; and means for repeating, by the first thread, exchanging the value of the task stolen flag in response to determining that any temporary flag of the plurality of temporary flags was true.

Example 31 includes the subject matter of Example 30, and wherein the means for determining whether any temporary flag of the plurality of temporary flags of the thread team was true comprises means for performing, in response to entering the synchronization barrier, a logical-OR reduction operation over the plurality of temporary flags of the thread team to provide a reduction value to each thread of the thread team.

Example 32 includes the subject matter of any of Examples 30 and 31, and wherein the means for exchanging the value of the task stolen flag of the first thread with false and storing the value of the task stolen flag in the temporary flag comprises means for atomically exchanging the value of the task stolen flag of the first thread with false and storing the value of the task stolen flag in the temporary flag.

Example 33 includes the subject matter of any of Examples 30-32, and further including means for executing, by the first thread, a first task from a task queue of the first thread; and means for determining, by the first thread, whether the task queue is empty; wherein the means for exchanging the value of the task stolen flag comprises means for exchanging the value of the task stolen flag in response to determining that the task queue is empty.

Example 34 includes the subject matter of any of Examples 30-33, and wherein each of the plurality of temporary flags corresponds to a thread of the thread team.

Example 35 includes the subject matter of any of Examples 30-34, and further including means for waiting, by the first thread, for other threads of the thread team to enter the synchronization barrier in response to entering the synchronization barrier.

Example 36 includes the subject matter of any of Examples 30-35, and further including means for stealing, by the first thread, a task from a second thread of the thread team in response to waiting for the other threads of the thread team to enter the synchronization barrier; and means for setting, by the first thread, a task stolen flag of the second thread to true in response to stealing the task.

Example 37 includes the subject matter of any of Examples 30-36, and wherein the means for stealing the task and the means for setting the task stolen flag of the second thread comprises means for atomically stealing the task and setting the task stolen flag of the second thread.

Example 38 includes the subject matter of any of Examples 30-37, and wherein the means for stealing the task comprises means for identifying the second thread of the thread team; and means for popping the task from a task queue of the second thread; wherein the means for popping the task and the means for setting the task stolen flag of the second thread comprises means for atomically popping the task and setting the task stolen flag of the second thread.

Example 39 includes the subject matter of any of Examples 30-38, and wherein the means for identifying the second thread comprises means for selecting the second thread randomly from the thread team.

Example 40 includes the subject matter of any of Examples 30-39, and wherein the means for identifying the second thread further comprises means for determining whether the task queue of the second thread is empty; and means for repeating selecting the second thread randomly in response to determining that the task queue is empty.

Example 41 includes the subject matter of any of Examples 30-40, and wherein the means for stealing the task further comprises means for executing, by the first thread, the task to completion in response to popping the task; means for determining, by the first thread, whether a task queue of the first thread is empty in response to executing the task to completion; means for popping, by the first thread, a second task from the task queue in response to determining the task queue is not empty; and means for executing, by the first thread, the second task to completion in response to popping the second task.

Example 42 includes the subject matter of any of Examples 30-41, and further including means for determining, by the first thread, whether the temporary flag of the first thread is equal to false in response to stealing the task from the second thread; wherein the means for setting the task stolen flag of the second thread to true further comprises means for setting the task stolen flag of the second thread to true in response to determining that the temporary flag is equal to false.

The invention claimed is:

1. A computing device for multithreaded execution, the computing device comprising:
   a transactional barrier module to:
      exchange, by a first thread of a thread team executed by the computing device, a value of a task stolen flag of the first thread with false and store the value of the task stolen flag in a temporary flag of the first thread, wherein the temporary flag is local to the first thread; and
      enter, by the first thread subsequent to exchange of the value of the task stolen flag, a synchronization barrier; and
   a reduction module to determine, by the first thread, whether any temporary flag of a plurality of temporary flags of the thread team was true by performance of a logical-OR reduction operation over the plurality of temporary flags of the thread team in response to entering the synchronization barrier to provide a reduction value to each thread of the thread team, wherein the thread team comprises a plurality of threads including the first thread;
   wherein the transactional barrier module is further to:
      repeat, by the first thread, exchange of the value of the task stolen flag in response to a determination that any temporary flag of the plurality of temporary flags was true.

2. The computing device of claim 1, wherein to exchange the value of the task stolen flag of the first thread with false and store the value of the task stolen flag in the temporary flag comprises to atomically exchange the value of the task stolen flag of the first thread with false and store the value of the task stolen flag in the temporary flag.

3. The computing device of claim 1, further comprising a task execution module to:
   execute, by the first thread, a first task from a task queue of the first thread; and
   determine, by the first thread, whether the task queue is empty;
   wherein to exchange the value of the task stolen flag comprises to exchange the value of the task stolen flag in response to a determination that the task queue is empty.

4. The computing device of claim 1, wherein the transactional barrier module is further to wait, by the first thread, for other threads of the thread team to enter the synchronization barrier in response to the entering of the synchronization barrier.

5. The computing device of claim 4, further comprising a task stealing module to:
   steal, by the first thread, a task from a second thread of the thread team in response to waiting for the other threads of the thread team to enter the synchronization barrier; and
   set, by the first thread, a task stolen flag of the second thread to true in response to stealing of the task.

6. The computing device of claim 5, wherein to steal the task and to set the task stolen flag of the second thread comprises to atomically steal the task and set the task stolen flag of the second thread.

7. The computing device of claim 5, wherein to steal the task comprises to:
   identify the second thread of the thread team; and
   pop the task from a task queue of the second thread;
   wherein to pop the task and set the task stolen flag of the second thread comprises to atomically pop the task and set the task stolen flag of the second thread.

8. The computing device of claim 5, wherein to steal the task further comprises to:
   execute, by the first thread, the task to completion in response to popping of the task;
   determine, by the first thread, whether a task queue of the first thread is empty in response to execution of the task to completion;
   pop, by the first thread, a second task from the task queue in response to a determination that the task queue is not empty; and
   execute, by the first thread, the second task to completion in response to popping of the second task.

9. The computing device of claim 5, wherein the task stealing module is further to:
   determine, by the first thread, whether the temporary flag of the first thread is equal to false in response to stealing of the task from the second thread;
   wherein to set the task stolen flag of the second thread to true further comprises to set the task stolen flag of the second thread to true in response to a determination that the temporary flag is equal to false.

10. A method for multithreaded execution, the method comprising:
   exchanging, by a first thread of a thread team executed by a computing device, a value of a task stolen flag of the first thread with false and storing the value of the task stolen flag in a temporary flag of the first thread, wherein the temporary flag is local to the first thread;
   entering, by the first thread subsequent to exchanging of the value of the task stolen flag, a synchronization barrier;
   determining, by the first thread, whether any temporary flag of a plurality of temporary flags of the thread team was true by performing, in response to entering the synchronization barrier, a logical-OR reduction operation over the plurality of temporary flags of the thread team to provide a reduction value to each thread of the thread team, wherein the thread team comprises a plurality of threads including the first thread; and
   repeating, by the first thread, exchanging the value of the task stolen flag in response to determining that any temporary flag of the plurality of temporary flags was true.

11. The method of claim 10, further comprising waiting, by the first thread, for other threads of the thread team to enter the synchronization barrier in response to entering the synchronization barrier.

12. The method of claim 11, further comprising:
   stealing, by the first thread, a task from a second thread of the thread team in response to waiting for the other threads of the thread team to enter the synchronization barrier; and
   setting, by the first thread, a task stolen flag of the second thread to true in response to stealing the task.

13. The method of claim 12, wherein stealing the task further comprises:
   executing, by the first thread, the task to completion in response to popping the task;
   determining, by the first thread, whether a task queue of the first thread is empty in response to executing the task to completion;
   popping, by the first thread, a second task from the task queue in response to determining the task queue is not empty; and
   executing, by the first thread, the second task to completion in response to popping the second task.

14. The method of claim 12, further comprising:
determining, by the first thread, whether the temporary flag of the first thread is equal to false in response to stealing the task from the second thread;
wherein setting the task stolen flag of the second thread to true further comprises setting the task stolen flag of the second thread to true in response to determining that the temporary flag is equal to false.

15. One or more computer-readable storage media comprising a plurality of instructions that in response to being executed cause a computing device to:
exchange, by a first thread of a thread team executed by the computing device, a value of a task stolen flag of the first thread with false and storing the value of the task stolen flag in a temporary flag of the first thread, wherein the temporary flag is local to the first thread;
enter, by the first thread subsequent to exchanging of the value of the task stolen flag, a synchronization barrier;
determine, by the first thread, whether any temporary flag of a plurality of temporary flags of the thread team was true by performance of a logical-OR reduction operation over the plurality of temporary flags of the thread team in response to entering the synchronization barrier to provide a reduction value to each thread of the thread team, wherein the thread team comprises a plurality of threads including the first thread; and
repeat, by the first thread, exchanging the value of the task stolen flag in response to determining that any temporary flag of the plurality of temporary flags was true.

16. The one or more computer-readable storage media of claim 15, further comprising a plurality of instructions that in response to being executed cause the computing device to wait, by the first thread, for other threads of the thread team to enter the synchronization barrier in response to entering the synchronization barrier.

17. The one or more computer-readable storage media of claim 16, further comprising a plurality of instructions that in response to being executed cause the computing device to:
steal, by the first thread, a task from a second thread of the thread team in response to waiting for the other threads of the thread team to enter the synchronization barrier; and
set, by the first thread, a task stolen flag of the second thread to true in response to stealing the task.

18. The one or more computer-readable storage media of claim 17, further comprising a plurality of instructions that in response to being executed cause the computing device to:
determine, by the first thread, whether the temporary flag of the first thread is equal to false in response to stealing the task from the second thread;
wherein to set the task stolen flag of the second thread to true further comprises to set the task stolen flag of the second thread to true in response to determining that the temporary flag is equal to false.

19. The one or more computer-readable storage media of claim 17, wherein to steal the task and to set the task stolen flag of the second thread comprises to atomically steal the task and set the task stolen flag of the second thread.

20. The one or more computer-readable storage media of claim 17, wherein to steal the task further comprises to:
execute, by the first thread, the task to completion in response to popping the task;
determine, by the first thread, whether a task queue of the first thread is empty in response to executing the task to completion;
pop, by the first thread, a second task from the task queue in response to determining the task queue is not empty; and
execute, by the first thread, the second task to completion in response to popping the second task.

21. The one or more computer-readable storage media of claim 15, wherein to exchange the value of the task stolen flag of the first thread with false and to store the value of the task stolen flag in the temporary flag comprises to atomically exchange the value of the task stolen flag of the first thread with false and store the value of the task stolen flag in the temporary flag.

* * * * *